United States Patent
Yagel et al.

(10) Patent No.: US 6,366,657 B1
(45) Date of Patent: Apr. 2, 2002

(54) SYSTEM AND METHOD FOR SUPPORTING AND MANAGING TELECOMMUNICATIONS SERVICES

(75) Inventors: Scott M. Yagel, McKinney; Mark A. Peterson, Coppell; Ronald L. Ward, Flower Mound; Nancy M. Korman, Plano, all of TX (US)

(73) Assignee: Alcatel USA Sourcing, L.P., Plano, TX (US)

( * ) Notice: Subject to any disclaimer, the term of this patent is extended or adjusted under 35 U.S.C. 154(b) by 0 days.

(21) Appl. No.: 08/861,497

(22) Filed: May 22, 1997

(Under 37 CFR 1.47)

Related U.S. Application Data

(60) Provisional application No. 60/018,622, filed on May 23, 1996, and provisional application No. 60/018,306, filed on May 24, 1996.

(51) Int. Cl.[7] .............................. H04M 3/42; G06F 9/00; G06F 9/46; G06F 15/163; G06F 19/00
(52) U.S. Cl. ............................ 379/201.03; 379/201.05; 379/201.12; 379/207.02; 379/221.08; 700/99; 709/104; 709/315
(58) Field of Search ................................ 379/201, 207, 379/230, 269, 201.01, 201.02, 201.03, 201.05, 201.12, 207.02, 221.08, 221.09, 221.1, 221.11, 221.12; 364/468.05; 395/182.02, 200.35, 500, 527, 680, 683; 700/99; 703/23, 24, 26, 27; 709/104, 310, 315

(56) References Cited

U.S. PATENT DOCUMENTS

| | | | |
|---|---|---|---|
| 5,241,588 A | * | 8/1993 | Babson, III et al. ........ 379/201 |
| 5,455,854 A | | 10/1995 | Dilts et al. ................... 379/201 |
| 5,481,601 A | * | 1/1996 | Nazif et al. ............. 379/230 X |
| 5,528,677 A | | 6/1996 | Butler et al. ................. 379/196 |
| 5,774,689 A | * | 6/1998 | Curtis et al. ............ 379/207 X |

FOREIGN PATENT DOCUMENTS

| | | | |
|---|---|---|---|
| WO | 9211724 | 7/1992 | ............ H04M/3/42 |
| WO | 9405112 | 3/1994 | .......... H04M/11/00 |
| WO | 9406232 | 3/1994 | ............ H01L/12/24 |
| WO | 9523469 | 8/1995 | ............ H04L/12/24 |
| WO | 9523483 | 8/1995 | ............ H04Q/3/00 |
| WO | 9529564 | 11/1995 | ............ H04Q/3/00 |
| WO | 9534975 | 12/1995 | ............ H04L/12/24 |

OTHER PUBLICATIONS

J. Allen, "An Environment for Rapid Service Development", Institution of Electrical Engineers, Apr. 18, 1993, pp. 211–216.

(List continued on next page.)

Primary Examiner—Harry S. Hong
(74) Attorney, Agent, or Firm—Baker Botts L.L.P.

(57) ABSTRACT

A system and method for supporting and managing telecommunications services in a telecommunications network includes a management information base builder toolkit (66, 110) for specifying object definitions in an object-oriented framework of a plurality of managed objects (112) that model resources (64) within the telecommunications network. The toolkit (66, 110) is used to construct a master management information base (70, 116) for storing the object definitions of the plurality of managed objects (112).

39 Claims, 4 Drawing Sheets

OTHER PUBLICATIONS

M.G Ryan, "The Intelligent Network Management Dilemma: Is There a Solution?", Annual Review of Communications, vol. 47, Jan. 1, 1993, pp. 416–419.

J.O. Bergholm, et al., "Service Design and Inventory System–An Object–Oriented Reusable Software Asset", AT&T Technical Journal, vol. 75, No. 2, Apr. 1, 1996, pp. 47–57.

J.C. Pennanec'h, "Intelligent Network Software Factory for Service Creation and Modification", Electrical Communication, vol. 63, No. 4, Jan. 1, 1989, pp. 345–355.

T. Magedanz, "A Preliminary Model for an Intelligent Network Management Support System", Institute of Electrical and Electronics Engineers, vol. 1 of 4, Jun. 14, 1992, pp. 169–173.

A. Hermann, et al., "PHAMOS–Philips Advanced Management and Operations System–Functionality and Architecture", Philips Telecommunication Review, vol. 51, No. 1, Mar. 1. 1993, pp. 30–42.

I. Yoda, et al., "Object Oriented TMN Based Operations Systems Development Platform", IEEE, 1994, pp. 1824–1829.

I. Yoda, et al., "Methods of Constructing a Management Information Base (MIB) in Transmission Network Operations", Electronics and Communications in Japan, vol. 76, No. 9, Sep. 1, 1993, pp. 21–33.

PCT Search Report(s) dated Feb. 9, 1998 and dated Feb. 16, 1998.

* cited by examiner

SYSTEM AND METHOD FOR SUPPORTING AND MANAGING TELECOMMUNICATIONS SERVICES

RELATED PATENT APPLICATIONS

This patent application claims the benefit of provisional U.S. Pat. application "System and Method for Telecommunications Service Commissioning", Application No. 60/018,622, filed on May 23, 1996 and provisional U.S. application "System and Method for Total Telecommunications Service Commissioning", Application No. 60/018,306, filed on May 24, 1996.

This application is related to copending U.S. patent application Ser. No. 08/861,498, "System and Method for Total Telecommunications Service Commissioning", filed on May 22, 1997, which also claims the benefit of U.S. Provisional Application No. 60/018,622, "System and Method for Telecommunications Service Commissioning", filed on May 23, 1996. U.S. Provisional Application No. 60/018,306, "System and Method for Total Telecommunications Service Commissioning", filed on May 24, 1996.

TECHNICAL FIELD OF THE INVENTION

This invention is related in general to the field of telecommunications. More particularly, the invention is related to a system and method for supporting and managing telecommunications services.

BACKGROUND OF THE INVENTION

In the current telephony environment, when a telecommunications services provider desires to provide a new service to its telephone customers, only the telecommunications equipment manufacturer and vendor has the knowledge and expertise to develop and deploy the new service. Because of past and current telecommunications system architecture and implementation, deploying new services is a slow and time-consuming process. With the advent of the Intelligent Network (IN) and Advanced Intelligent Network (AIN), which include the availability of a Service Creation Environment (SCE), new services may be readily created and provided to the Service Control Point (SCP) for execution, and to the Service Management System (SMS) for management. However, there are many other business functions such as billing, sales, marketing, and customer support, related to deploying a new service, all that may need to support the new service in the same rapid manner as creating and providing those new services to fully deploy the newly-created services.

SUMMARY OF THE INVENTION

Accordingly, it is desirable to provide a master specification of the network resources or a master management information base which combines or integrates the managed object definitions of network resources based on standards bodies, consortia, service providers, and equipment manufacturers and provides access thereto by operation support systems at various levels of management within the network. It is also desirable to provide a toolkit that enables the preparation of the master management information base from the standard management information bases.

In one aspect of the invention, a system for supporting and managing telecommunications services in a telecommunications network includes a management information base builder toolkit for specifying object definitions in an object-oriented framework of a plurality of managed objects that model resources within the telecommunications network. The toolkit is used to construct a master management information base for storing the object definitions of the plurality of managed objects.

In another aspect of the invention, a method for supporting and managing telecommunications services in a telecommunications network includes the steps of specifying object definitions in an object-oriented framework of a plurality of managed objects that model resources within the telecommunications network, and then storing the object definitions of the plurality of managed objects in a master management information base accessible to operation and support systems.

A technical advantage of the present invention is the ability to rapidly deploy services in the telecommunications network by specifying and incorporating the various network resource object definitions based on telecommunications standards, requirements of service providers, and equipment manufacturers' products to create a master specification or management information base repository of object definitions. The master management information base is accessible by operational and support systems at all levels of management within the telecommunications network.

BRIEF DESCRIPTION OF THE DRAWINGS

For a better understanding of the present invention, reference may be made to the accompanying drawings, in which.

DETAILED DESCRIPTION OF THE INVENTION

Figure 1:
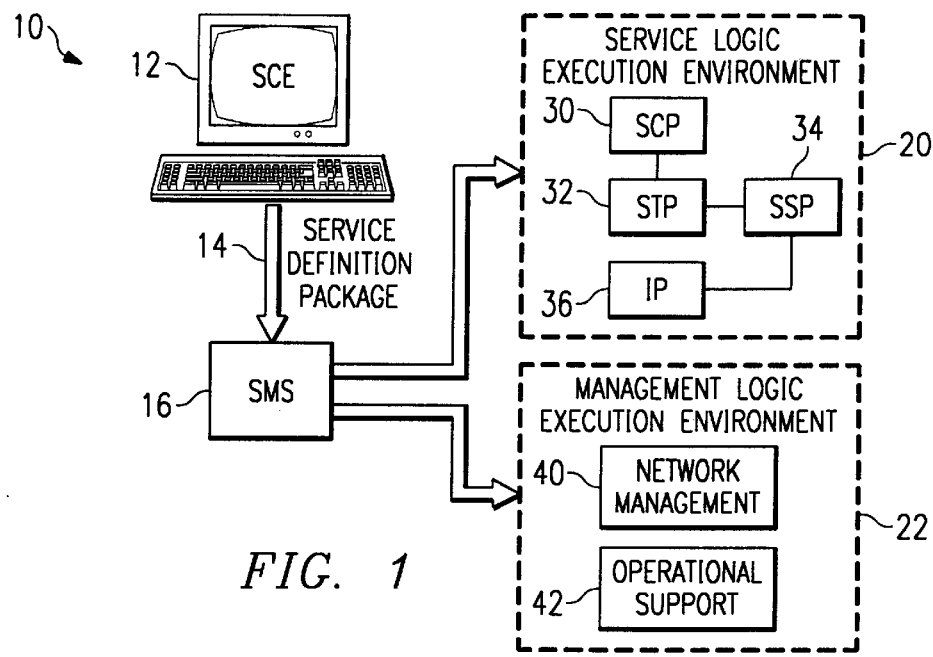
FIG. 1 is a simplified block diagram illustrating the concept of total service commissioning according to the teachings of the present invention.

Referring to FIG. 1, which is a simplified block diagram illustrating the concept of total service commissioning according to the teachings of the present invention, total service commissioning system 10 augments the role of a service creation environment to a service commissioning environment (SCE) 12, so that newly added services are fully deployed functionally as well as deployed with full support and management. Service commissioning environment (SCE) 12 is a collection of toolkit applications running on an engineering workstation or other suitable computing environment. Service commissioning environment 12 provides a capability for creating new services from reusable components, testing the new services, verifying the logic, and deploying the new services.

Further, service commissioning environment 12 provides toolkits for creating the logic, data, and templates to support and manage the new services. The new service logic, support and management information are collected in a service definition package created in service commissioning environment 12. Service definition package 14 is transmitted to a Service Management System (SMS) 16 node in the telecommunications network for management functions. Service Management System 16 serves as a network distribution node which distributes service definition package 14 to a service logic execution environment 20 and a management logic execution environment 22. Service logic execution environment 20 may reside on a number of telecommunication network nodes, including nodes in an Intelligent Network (IN) or Advanced Intelligent Network (AIN): Service Control Point (SCP) 30, Service Transfer Point (STP) 32, Signal Switching Point (SSP) 34, and Intelligent Peripheral (IP) 36. Typically, Service Control Point 30 is the service intelligence for the Advanced Intelligent Network and contains the logic and data used to provide advanced services. Service Transfer Point 32 supports the transfer of control messages between Service Control Point 30 and Signal Switching Point 34 using the Signaling System No. 7 (SS7) network. Signal Switching Point 34 is the interface to the service subscriber or caller and is capable of recognizing when a particular call requires Intelligent Network services. Intelligent Peripheral 36 typically contains the functionality and resources for exchanging information with the caller, such as playing voice announcements and collecting dual tone multifrequency (DTMF) digits. The telecommunications services defined in service definition package 14 are thus carried out in service logic execution environment 20 residing in these Advanced Intelligent Network components.

Service definition package 14 is further provided by Service Management System 16 to management logic execution environment 22, which may include network management systems 40 and operational support systems 42. Service definition package 14 contains the necessary logic and data to allow management logic execution environment 22 to provide front and back office functions to support the services executed in service logic execution environment 20.

Figure 2:
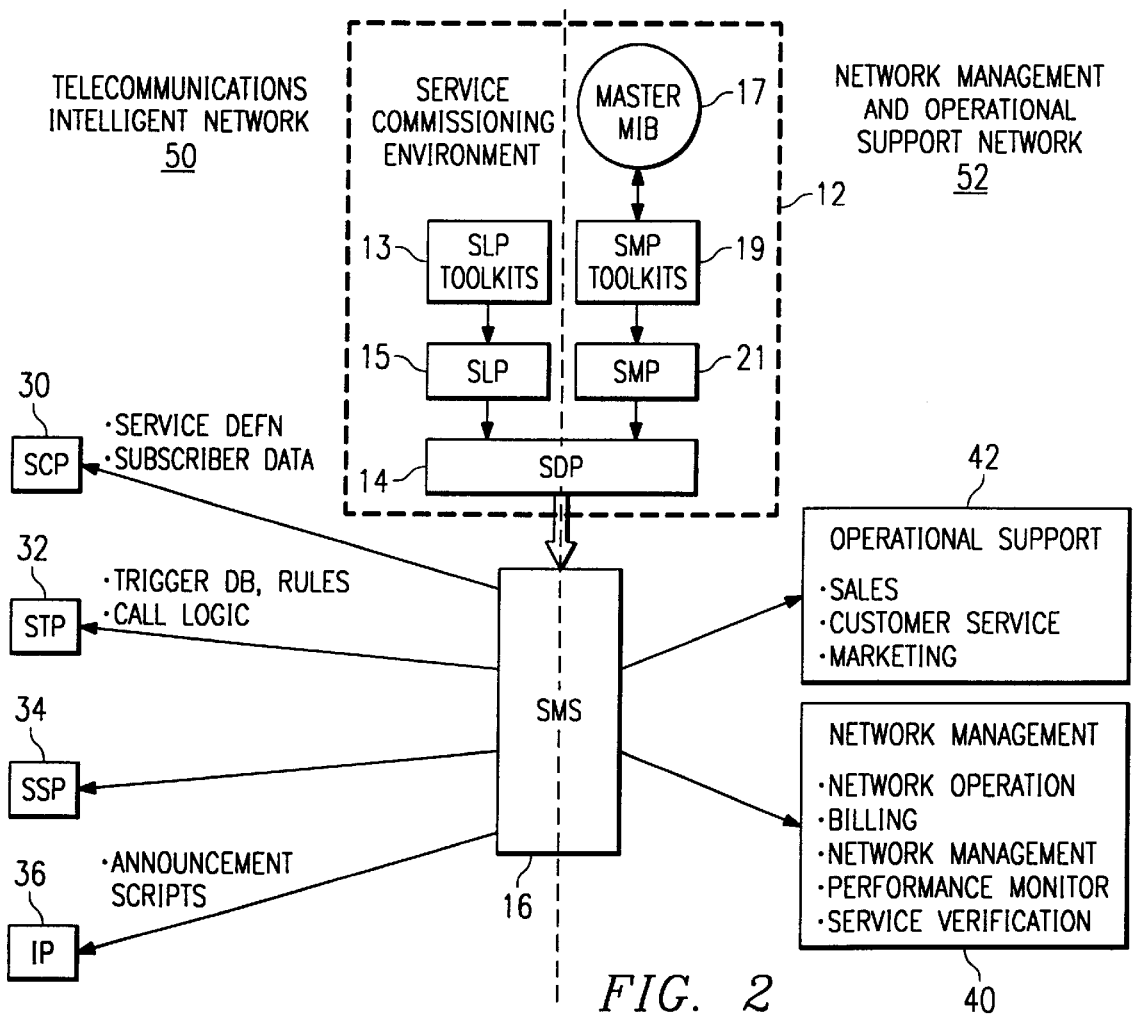
FIG. 2 is a more detailed block diagram illustrating the concept of total service commissioning according to the teachings of the present invention.

Referring to FIG. 2, which is a more detailed block diagram illustrating the concept of total service commissioning according to the teachings of the present invention, Service Commissioning Environment 12 includes Service Logic Program (SLP) toolkits 13 for creating service logic programs 15. Service Commissioning Environment 12 further includes a master management information base (MIB) 17 which is a collection of object definitions modeling the resources in the telecommunications network and business systems. Service Management Program (SMP) toolkits 19 have access to master management information base 17 to create service management programs that support and manage the services specified in service logic programs 15. Service logic programs 15 and service management programs 21 are combined into service definition package 14, which is provided to Service Management System 16. Service Management System 16 may serve as a central distribution point which then transmits service definition package 14 or selected portions thereof to nodes in a telecommunications network 50 such as an Intelligent Network or Advanced Intelligent Network. One or more other network nodes may also service this distribution function. Service definitions and subscriber data may be transmitted to databases residing in Service Control Point 30 to modify or add to the data stored therein. Service definition package 14 may also include a trigger database and rules and call logic, which are provided to Signal Transfer Point 32 and Signal Switching Point 34. Further, Intelligent Peripheral 36 may receive announcement scripts defined in service definition package 14.

Service Management System 16 may also serve as the distribution point for transmitting management logic, data, templates, and other information to network management and operational support networks 40 and 42, respectively. For example, customer service data, service order information, marketing and sales information may be provided to operational support systems 42 in the front office which support sales and marketing of subscriptions to the new service and customer service. Further, information such as billing information, network management code and data, performance monitoring metrics and specifications may be provided by Service Management System 16 to network management systems 40 to the back office for supporting operations of the network, billing, and network management and monitoring.

Figure 3:
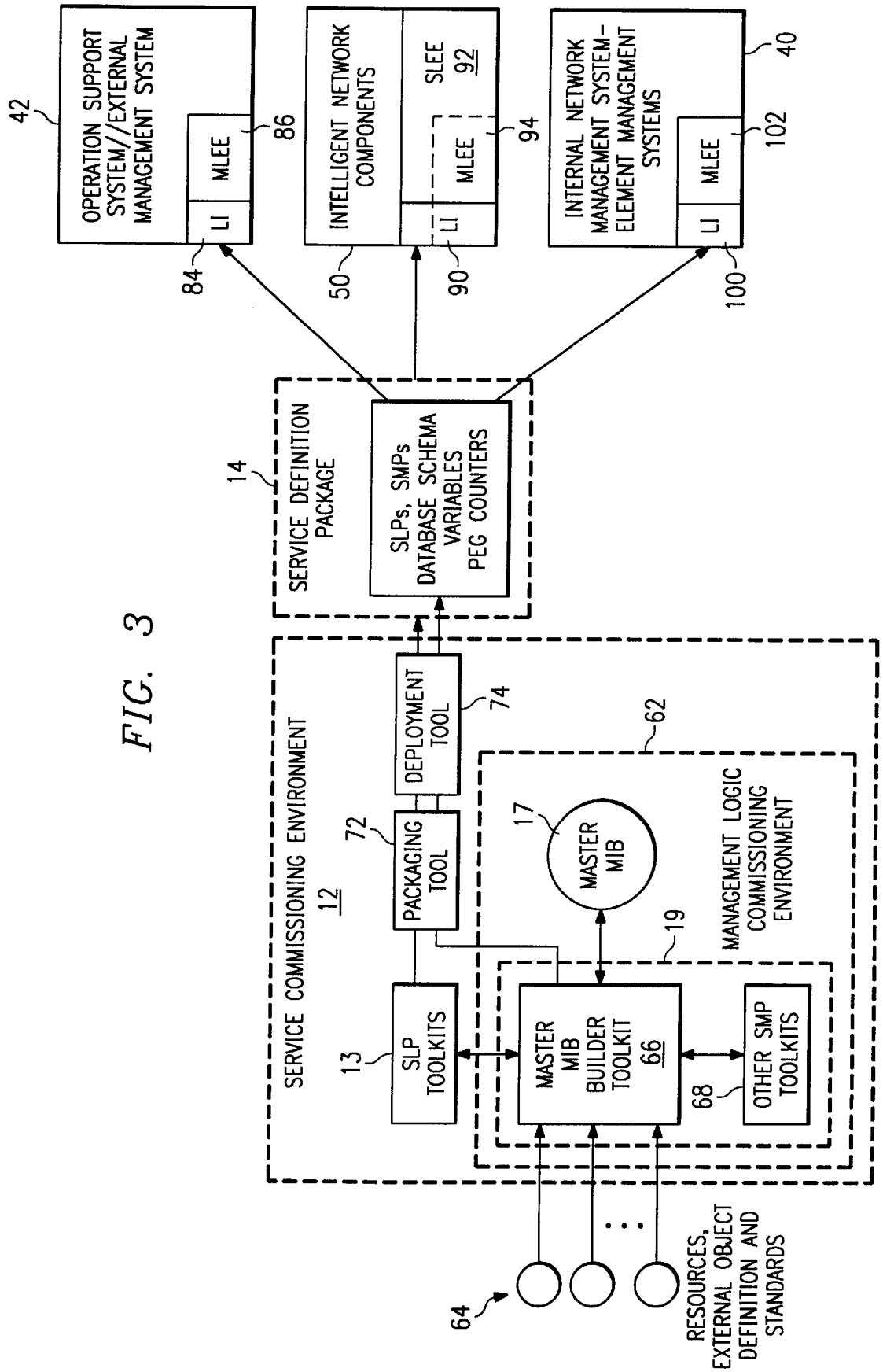
FIG. 3 is a block diagram of total service commissioning using a number of toolkits including a master management information base builder for building a master management information base according to the teachings of the present invention.

FIG. 3 is a block diagram of total service commissioning using a number of toolkits including a master management information base builder for building a master management information base according to the teachings of the present invention. Service Commissioning Environment 12 includes a number of service log program toolkits 13 which may be used to generate service logic programs and database schema describing the structure in which data are stored. An intuitive visual programming language and a library of reusable objects or service independent building blocks and templates may be manipulated in a service logic editor to specify service logic flow and data parameters.

Service commissioning environment 12 further includes a management logic commissioning environment (MLCE) 62, which includes a master management information base builder toolkit 66, management logic commissioning environment toolkits 68, and a master management information base 70. Management logic commissioning environment toolkits 68 are used to generate service management programs which provide support and management functions for the deployed services. Service management programs may include agent processes and manager processes, where the manager process directs the agent processes to perform particular functions upon an object that affects the underlying network resource that the object models. Both manager and agent processes have access to a master information base 70. Service management programs may include process flows, processes specified by linked service independent building blocks, rules, and other logic expressions.

Master management information base 70 is a repository of managed objects which abstractly model or describe the properties and behavior of physical and logical resources of network elements in the telecommunications network. Physical resources, for example, include the printed circuit boards, processors, disks, and power supplies that are grouped together to form part or all of a physical network element. Logical resources include the software applications, and concepts such as "circuit" or "link", that have properties but are not physical in nature. Resources within a service provider network can thus be modeled as objects with object-oriented methodologies in an object-oriented framework. The object definition for a resource includes a definition of its attributes, behaviors, methods, and relationships between it and other objects.

Service commissioning environment 12 further includes a packaging tool 72 and a deployment tool 74 which packages the service logic programs, service management programs, database schema, variables, peg counters, and other information into a service definition package 80. Service definition package 80 is provided to network and element management systems 40, operational support and management systems 42, and Intelligent Network components 50. Network and element management systems 40 and operational support and management systems 42 both include logic interpreters (LI) 84 and 100, which may reside in respective management logic execution environments 86 and 102. Logic interpreters 84 and 100 interpret the service management programs which may be expressed in an interpreted language. Further, Intelligent Network components 50 may include logic interpreter 90, a service logic execution environment 92, and a management logic execution environment 94 for interpreting service logic programs, service management programs, and executing the interpreted logic.

Figure 4:
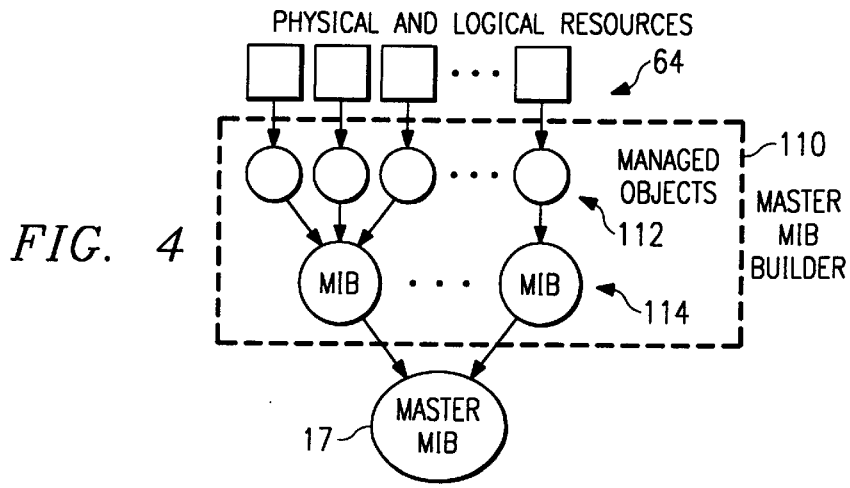
FIG. 4 is a simplified block diagram illustrating the construction of the master management information base according to the teachings of the present invention.

FIG. 4 is a simplified block diagram illustrating the construction of the master management information base according to the teachings of the present invention. Physical and logical resources 64 in the network elements or components are abstractly modeled and described by managed objects 112 in an object-oriented framework. The modeling and definition process may be facilitated by the master managed information base builder 110. Collections or repositories of managed objects 112 may be formed into managed information bases 114. In turn, collections of managed information bases are formed into a master management information base 116, which is the master specification of network object behaviors and properties. The master specification can be used to derive different forms of object definitions depending upon the requirements or the operation support system. For example, the master specification may be used to derive:

A C++ object definition;

A SmallTalk object definition;

An International Telecommunications Union (ITU) standards compliant description for Telecommunications Management Network (TMN);

An Internet Engineering Task Force (IETF) complaint description for Telecommunications Management Network networks;

Agent application logic;

Manager application logic; and

Graphical user interface applications for object attribute modification and display.

Figure 5:
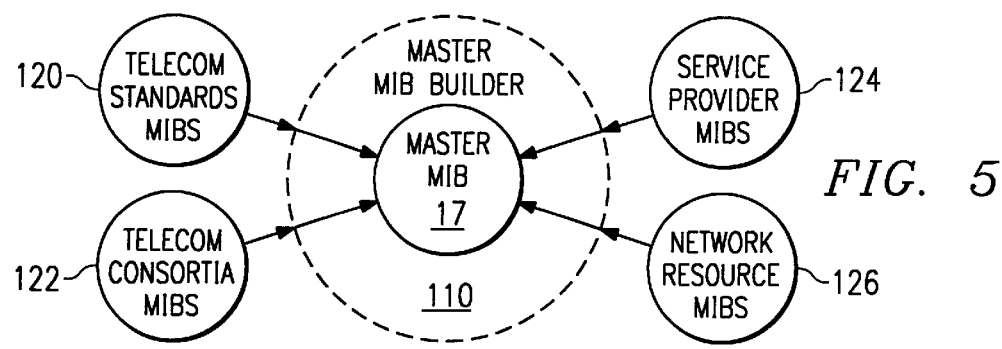
FIG. 5 is a simplified block diagram of the sources of object definition for the master management information base according to the teachings of the present invention.

In order to effectively manage a multi-vendor, multi-service network, management information bases are needed to provide description of the network resources. There are many standards bodies and industry consortia that may specify information that may be incorporated in management information bases 120 and 122 in FIG. 5, which is a simplified block diagram of the master management information base builder according to the teachings of the present invention. The standards bodies and industry consortia include:

1. International Telecommunications Union (ITU)
2. Internet Engineering Task Force (IETF)
3. Network Management Forum (NMF)
4. ATM Forum
5. SONET Interoperability Forum (SIF)
6. SONET Interoperability Forum (SIF)
7. Bellcore
8. European Telecommunications Standards Institute (ETSI)

Figure 6:
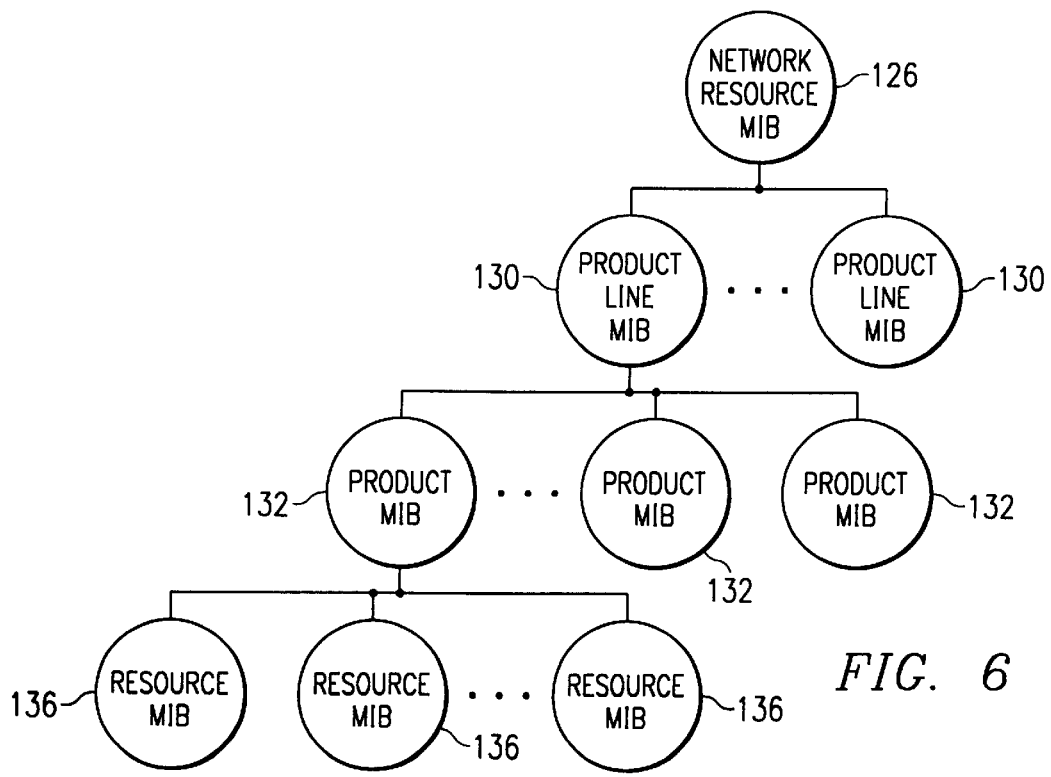
FIG. 6 is a simplified diagram illustrating the hierarchical structure of the master management information base.

These organizations are typically made up of governmental standard setting organizations, and/or equipment manufacturers. Since the recommendations generated by the organizations are designed to cover a wide variety of services and products, they are typically general in scope. Thus, in addition to the more general management information bases defined or generated based on recommendations from these organizations, more specific service provider management information bases 124 may be specified by telecommunications service providers. Network resource management information bases 126 may be specified by equipment manufacturers that describe their specific service needs and products. For example and referring to FIG. 6, which is a simplified diagram, illustrating the hierarchical structure of the master management information base. An equipment manufacturer may develop a management information base 126 that defines the unique behavior of the resources contained in its products 132, higher-level a management information bases that define the common objects within its products and product lines 130, and product specific management information bases 136 that define the resources unique to each product.

Figure 7:
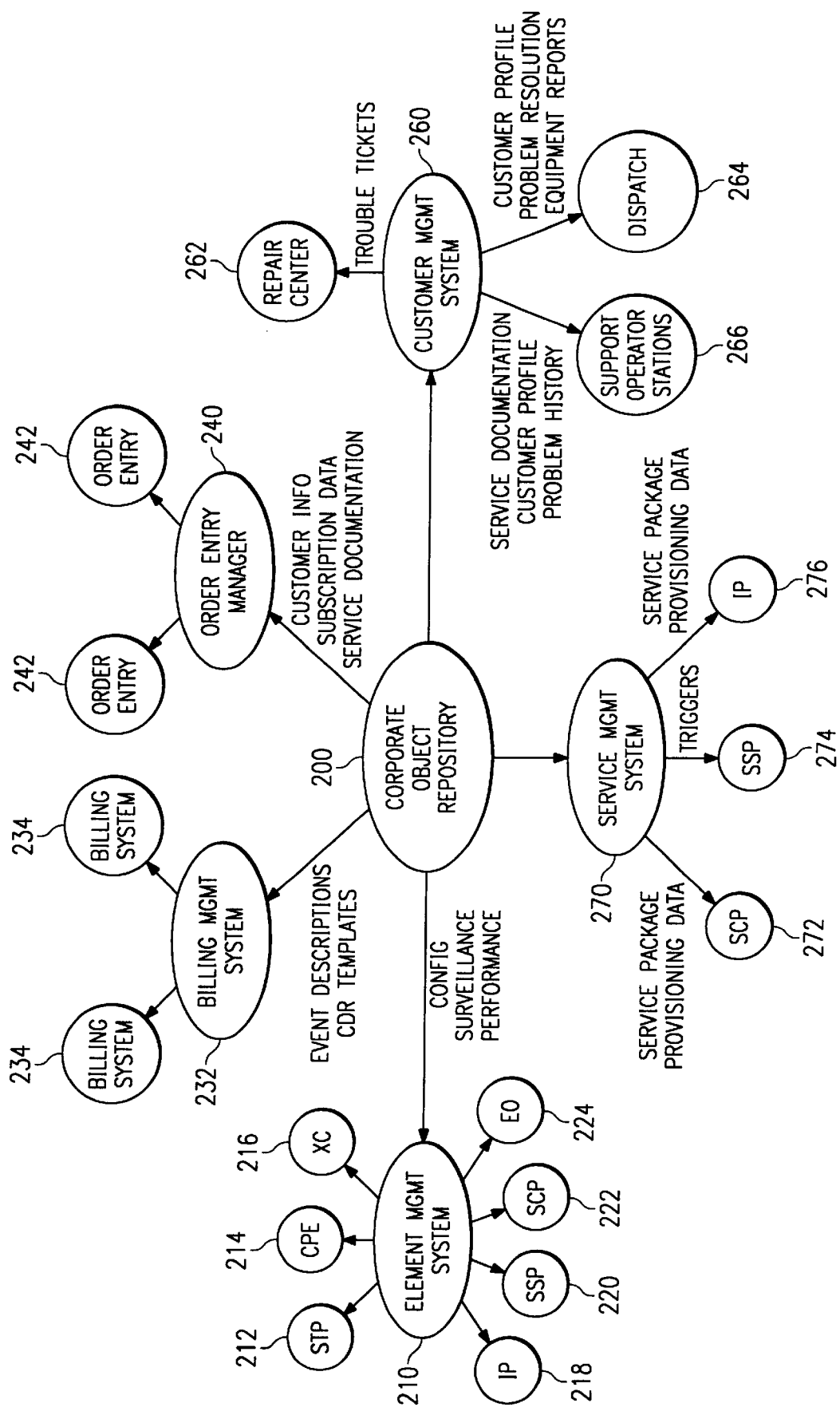
FIG. 7 is a simplified diagram of an object-oriented view of the master management information base.

Referring to FIG. 7, a more detailed object-oriented view of the master management information base shown as a corporate object repository 200 is provided. Corporate object repository 200 includes objects modeling a service provider's network management and support systems and interface thereto, from which more specific objects may inherit behavior and data structures to derive more specific or unique management and support systems with added behavior and data structures. Element management system objects 210 may be derived from object definitions specified in corporate object repository 200 with provisions for configuration, surveillance, performance monitoring, and other network management functions. Element management system objects 210 are further used to derived specific management and interface objects for signal transfer point 212, customer premises equipment (CPE) 214, cross-connects 216, Intelligent Peripherals 218, Signal Switching Point 220, Service Control Point 222, and end office (E0) 224. Specific billing management system objects 232 have provisions for event descriptions for which billing is needed and call detail record (CDR) templates, for example. From billing management system objects 232 specific objects for billing systems 234 may be derived by inheritance.

Order entry manager objects 240 have provisions for customer information, subscription data, and service documentation inherited from objects defined in corporate object repository 200. Further specific order entry system and interface objects 242 may be derived by inheriting methods and data from order entry manager objects 240. Customer management system and interface objects 260 may be derived from objects defined in corporate object repository 200. Objects for modeling a repair center 262, service dispatch 264, support operator stations 266, and interfaces thereto may be derived by inheritance from customer management system objects 260. Further, Service Management System objects 270 may be derived from objects defined in corporate object repository 200 to further derive management objects and interfaces for Service Control Point 272, Signal Switching Point 274, Intelligent Peripheral 276, and other network nodes.

Thus, service commissioning environment 10 enhances the role of the Service Creation Environment to provide enough information about a service such that all management functions for that service can be derived from the definition of the service. Service commissioning system and method according to the teachings of the present invention extends the definitions of the service specification to include management logic and management parameters to meet the needs of all management software.

What is claimed is:

1. A system for supporting and managing telecommunications services in a telecommunications network, comprising:

a management information base builder toolkit for specifying object definitions in an object-oriented framework of a plurality of managed objects that model resources within the telecommunications network and business systems supporting and managing the network resources; and a master management information base storing the object definitions of the plurality of managed objects.

2. The system, as set forth in claim 1, wherein the master management information base comprises a plurality of sub-management information bases.

3. The system, as set forth in claim 1, wherein the master management information base comprises at least one sub-management information base having object definitions of telecommunications network resources as defined by telecommunications standards.

4. The system, as set forth in claim 1, wherein the master management information base comprises at least one sub-management information base having object definitions of telecommunications network resources as defined by telecommunications consortia.

5. The system, as set forth in claim 1, wherein the master management information base comprises at least one sub-management information base having object definitions of telecommunications network resources as defined by a telecommunications service provider.

6. The system, as set forth in claim 1, wherein the master management information base comprises at least one sub-management information base having object definitions of telecommunications network resources as defined by a telecommunications equipment manufacturer.

7. The system, as set forth in claim 6, wherein the sub-management information base comprises a hierarchical organization of telecommunications network resource management information bases, product line management information bases, and product management information bases.

8. The system, as set forth in claim 2, wherein the plurality of sub-management information bases comprise a billing management system objects management information base.

9. The system, as set forth in claim 2, wherein the plurality of sub-management information bases comprise an order entry management system objects management information base.

10. The system, as set forth in claim 2, wherein the plurality of sub-management information bases comprise an element management system objects management information base.

11. The system, as set forth in claim 2, wherein the plurality of sub-management information bases comprise a customer management system objects management information base.

12. The system, as set forth in claim 2, wherein the plurality of sub-management information bases comprise a service management system objects management information base.

13. The system, as set forth in claim 1, wherein the object definition for each managed object stored in the master managed information base comprises:

an attribute definition;

a method definition; and a definition of relationships between the managed object and other managed objects, if any.

14. A method for supporting and managing telecommunications services in a telecommunications network, comprising:

specifying object definitions in an object-oriented framework of a plurality of managed objects that model resources within the telecommunications network and business systems supporting and managing the network resources;

storing the object definitions of the plurality of managed objects in a master management information base accessible to operation and support systems:and generating service management programs in response to accessing the stored object definitions, the service management programs operable to allow the operation and support systems to manage data associated with the modeled resources.

15. The method, as set forth in claim 14, further comprising the step of hierarchically organizing the object definitions into sub-management information bases of the master management information base.

16. The method, as set forth in claim 14, further comprising the step of specifying object definitions of telecommunications network resources as defined by telecommunications standards.

17. The method, as set forth in claim 14, further comprising the step of incorporating object definitions of telecommunications network resources as defined by telecommunications consortia.

18. The method, as set forth in claim 14, further comprising the step of incorporating object definitions of telecommunications network resources as defined by a telecommunications service provider.

19. The method, as set forth in claim 14, further comprising the step of incorporating object definitions of telecommunications network resources as defined by a telecommunications equipment manufacturer.

20. The method, as set forth in claim 14, further comprising the step of incorporating a hierarchical organization of telecommunications network resources management information bases, product line management information bases, and product management information bases.

21. The method, as set forth in claim 14, further comprising the step of incorporating object definitions of resources in a billing management system.

22. The method, as set forth in claim 14, further comprising the step of incorporating object definitions of resources in an order entry management system.

23. The method, as set forth in claim 14, further comprising the step of incorporating object definitions of resources in an element management system.

24. The method, as set forth in claim 14, further comprising the step of incorporating object definitions of resources in a customer management system.

25. The method, as set forth in claim 14, further comprising the step of incorporating object definitions of resources in a service management system.

26. The method, as set forth in claim 14, wherein the step of specifying an object definition for each managed object stored in the master managed information base comprises the steps of:

specifying an attribute definition;

specifying a method definition; and specifying a definition of relationships between the managed object and other managed objects, if any.

27. A system for supporting and managing telecommunications services in a telecommunications network, comprising:
- a master management information base storing object definitions in an object-oriented framework of a plurality of managed objects, the managed objects modeling resources within the telecommunications network; and
- a service management program toolkit in communication with the master management information base and operable to access the managed objects, the service management toolkit further operable to create a service management program operable to manage at least one of the telecommunications services.

28. The system of claim 27, and further comprising a management information base builder toolkit in communication with the master management information base and operable to generate new object definitions in the master management information base, the generated object definitions being associated with creating resource definitions for at least one new telecommunications service.

29. The system of claim 27, and further comprising a service management system in communication with the master management information base, the service management system operable to distribute the created service management program to nodes in the telecommunications network.

30. The system of claim 27, wherein the service management program includes logic operable to provide front office functionality when distributed to an operational support system.

31. The system of claim 27, wherein the service management program includes logic operable to provide back office functionality when distributed to a network management system.

32. The system of claim 27, the system further comprising:
- a management information base builder toolkit in communication with the master management information base and operable to generate new object definitions in the master management information base, the generated object definitions being associated with creating resource definitions for at least one added telecommunications service; and
- wherein the service management program is generated by the service management program toolkit using the generated object definitions, the service management program being operable to manage the at least one added telecommunications service, the service management program being communicated by a service management system of the telecommunications network to a network management system of the telecommunications netware, the service management program being further operable to provide front office functionality associated with the at least one added telecommunications service.

33. A method for supporting and managing telecommunications services in a telecommunications network, comprising:
- generating object definitions, the object definitions modeling resources in the telecommunications network;
- storing the object definitions in an object-oriented framework;
- accessing certain of the object definitions that are associated with a particular telecommunications service; and
- creating a service management program in response to the accessed object definitions, the service management program operable to manage the particular telecommunications service.

34. The method of claim 33, and further comprising communicating the created service management program to a plurality of nodes in the telecommunications network.

35. The method of claim 33, wherein creating the service management program includes generating front office management logic.

36. The method of claim 35, and further comprising communicating the service management program to an operational support system of the telecommunications network.

37. The method of claim 33, wherein creating the service management program includes generating back office management logic.

38. The method of claim 37, and further comprising communicating the service management program to a network management system of the telecommunications network.

39. The method of claim 33, and further comprising:
- generating a service definition package, the service definition package including the created service management program and additional resources associated with the particular telecommunications service; and
- communicating the service definition package to a network node, the network node using the service definition package to manage the particular telecommunications service.

* * * * *